United States Patent

Swiderek

(10) Patent No.: US 8,476,839 B2
(45) Date of Patent: Jul. 2, 2013

(54) ELECTRONIC METHOD TO IMPROVE THE STARTING CHARACTERISTICS OF DIRECT CURRENT ARC LAMPS

(75) Inventor: Stanislaw W. Swiderek, Londonderry, NH (US)

(73) Assignee: Hubbardton Forge, LLC, Castleton, VT (US)

( * ) Notice: Subject to any disclaimer, the term of this patent is extended or adjusted under 35 U.S.C. 154(b) by 272 days.

(21) Appl. No.: 13/092,516

(22) Filed: Apr. 22, 2011

(65) Prior Publication Data

US 2011/0260637 A1    Oct. 27, 2011

Related U.S. Application Data

(60) Provisional application No. 61/326,815, filed on Apr. 22, 2010.

(51) Int. Cl.
*H05B 37/02*   (2006.01)
*H05B 39/04*   (2006.01)
*H05B 41/36*   (2006.01)

(52) U.S. Cl.
USPC ............... 315/224; 315/209 CD; 315/209 M; 315/DIG. 2

(58) Field of Classification Search
USPC ............... 315/224, 209, 209 M, 234, 244, 315/227 A, DIG. 2, DIG. 5, DIG. 7
See application file for complete search history.

(56) References Cited

U.S. PATENT DOCUMENTS 8,013,543 B2 *   9/2011   Feng ............................. 315/307
2004/0061453 A1 *   4/2004   Konopka et al. ............. 315/291

* cited by examiner

*Primary Examiner* — Anh Tran
(74) *Attorney, Agent, or Firm* — Bourque and Associates, PA

(57) ABSTRACT

A series connected L-C resonant circuit is connected between a lamp electrode of a xenon arc lamp and chassis ground. The L-C circuit has the ability to store energy as well as act as an oscillator. Energized by an initial high voltage pulse to a xenon arc lamp, the L-C circuit extends the 'tail' of the initial high voltage pulse provided to ignite the xenon arc lamp with a train or series of high frequency oscillations, which gradually decay. This resonant 'tail' causes the plasma streamer in the lamp to remain in the ionized state for an extended time period, until current ramp to the lamp up occurs, resulting in highly reliable ignition of the xenon arc lamp.

2 Claims, 1 Drawing Sheet

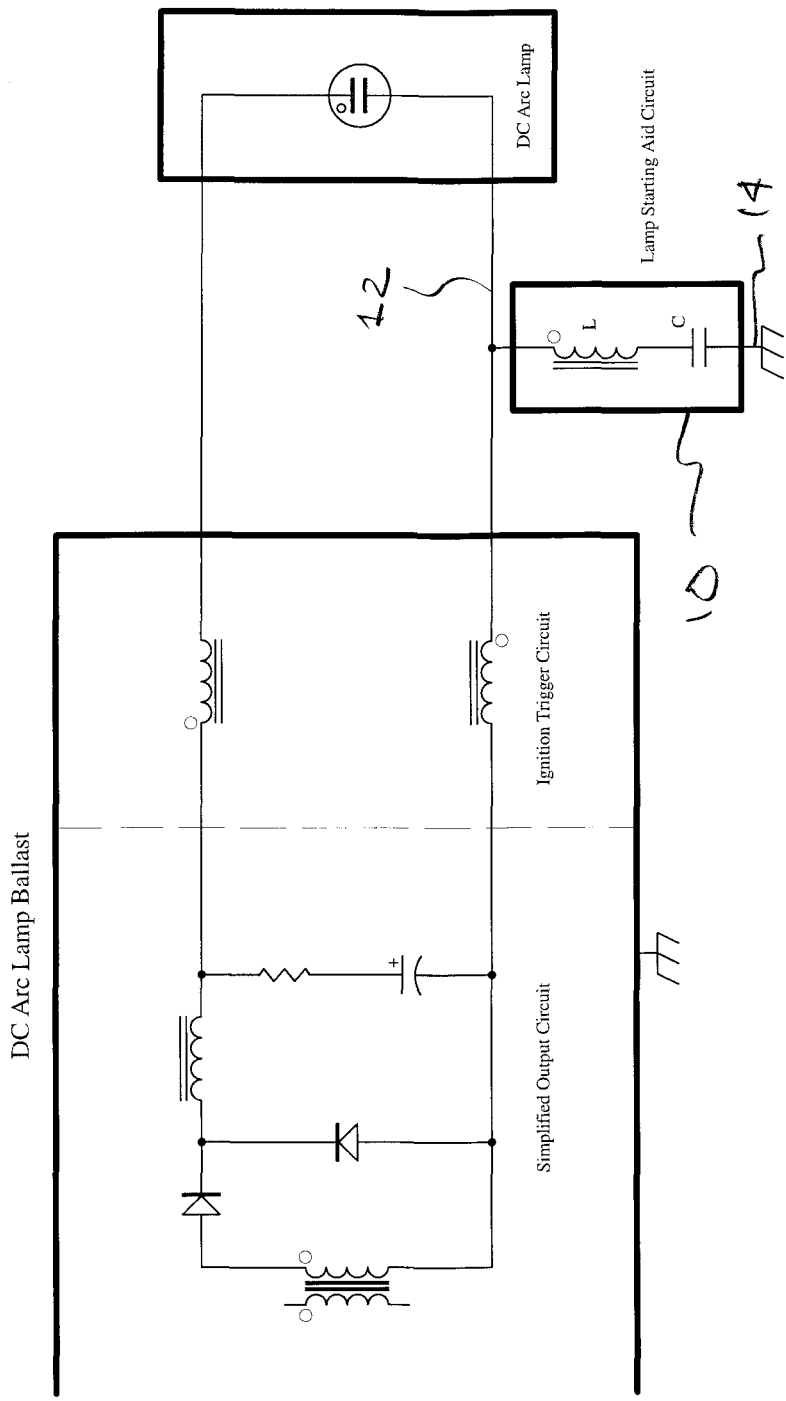

ELECTRONIC METHOD TO IMPROVE THE STARTING CHARACTERISTICS OF DIRECT CURRENT ARC LAMPS

CROSS-REFERENCE TO RELATED APPLICATIONS

This application claims priority from U.S. Provisional Patent Application No. 61/326,815, titled "A NEW ELECTRONIC METHOD TO IMPROVE THE STARTING CHARACTERISTICS OF DIRECT CURRENT XENON ARC LAMPS", which was filed on Apr. 22, 2010 and incorporated fully herein by reference

TECHNICAL FIELD

The present invention relates to DC arc lamps and more particularly, to a method for improving the starting circuit for such DC arc lamps such as Xenon arc lamps.

BACKGROUND

DC arc lamps such as a xenon arc lamp requires a very brief high voltage pulse, typically 20 kV or higher, to create an initial 'streamer' of ionized gas between the cathode and anode of the lamp. This creates a conductive path of charge-carrying ions. Following this pulse, and before the ionization naturally decays due to recombination of ions, the direct current supplied to the lamp, at low voltage, must be ramped up quickly, but in a controlled manner. This increasing current sustains the ionization and develops the initial streamer into a full scale arc. Once the full arc is achieved, the lamp is supplied in a constant-current mode, to ensure stable operation and to avoid over-driving the lamp.

It is highly desirable, in many critical applications, that lamps ignite 100% reliably each time that ignition is attempted. Conventional starting circuits, however, allow only a brief interval between the cessation of the high voltage pulse and the initiation of the current ramp up. This is primarily due to the inductance in the ignition pulse generating circuit, which conventionally employs a transformer that slows the rate of increase in current. This delay may cause intermittent misfiring of the lamp causing the lamp to not ignite 100% of the time.

Accordingly what is needed is a simple and reliable starting circuit for arc lamps such as Xenon arc lamps that reliably ignites the lamp 100% of the time.

It is important to note that the present invention is not intended to be limited to a device or method which must satisfy one or more of any stated or implied objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the allowed claims and their legal equivalents.

SUMMARY

The present invention features a starting circuit for an arc lamp. The starting circuit comprises a series coupled L-C resonant circuit, a first end of said series coupled L-C resonant circuit is connected between a first lamp electrode and a chassis ground. A source of a high voltage impulse is coupled to the first lamp electrode and the first end of the series L-C resonant circuit, wherein the high voltage impulse is configured to energize the L-C resonant circuit, thereby causing the L-C resonant circuit to extend a tail of said high voltage impulse with a series of high frequency oscillations, wherein the tail is configured to cause a plasma streamer to remain in an ionized state for period of time which is greater than a period of time the plasma streamer would remain in an ionized state without the series L-C resonant circuit, at least until a current ramp in the arc lamp up occurs.

The invention also features a method of starting a direct current arc lamp, such as an Xenon arc lamp, the method comprises the acts of connecting a series coupled L-C resonant circuit between a first lamp electrode and a chassis ground, wherein the series connected L-C resonant circuit is configured to store energy and act as an oscillator. The method next includes energizing the series coupled L-C resonant circuit with an initial high voltage impulse, wherein the series coupled L-C resonant circuit is configured to extend a tail or end of the initial high voltage impulse with a plurality of high frequency oscillations, wherein the plurality of high frequency oscillations is configured to cause a plasma streamer in said xenon arc lamp to remain in an ionized state for an extended time until a current ramp up occurs.

BRIEF DESCRIPTION OF THE DRAWINGS

These and other features and advantages of the present invention will be better understood by reading the following detailed description, taken together with the drawings wherein:

FIG. 1 is a schematic diagram of the starting circuit in accordance with the present invention.

DESCRIPTION OF THE INVENTION

The invention utilizes a simple L-C resonant circuit 10, FIG. 1, connected between a lamp electrode 12 to chassis ground 14. This circuit 10 has the ability to store energy as well as act as an oscillator. Energized by an initial high voltage pulse applied to the lamp electrode 12, this circuit extends the 'tail' or end of the voltage pulse with a train or series of high frequency (in the range of 1 Mhz) oscillations, which gradually decay. An exemplary circuit 10 including a capacitor having a value of 3300 pF and an inductor or ignition core having a value of 15 T an F.A. has proved satisfactory. This resonant 'tail' causes the plasma streamer in the lamp to remain in the ionized state for an extended time, until the current ramp up occurs that will keep the lamp ignited. This results in highly reliable ignition.

As mentioned above, the present invention is not intended to be limited to a device or method which must satisfy one or more of any stated or implied objects or features of the invention and should not be limited to the preferred, exemplary, or primary embodiment(s) described herein. Modifications and substitutions by one of ordinary skill in the art are considered to be within the scope of the present invention, which is not to be limited except by the allowed claims and their legal equivalents.

The invention claimed is:

1. A starting circuit for an arc lamp, the starting circuit comprising:
 a series coupled L-C resonant circuit, a first end of said series coupled L-C resonant circuit connected between a first lamp electrode and a chassis ground; and
 a source of a high voltage impulse, coupled to said first lamp electrode and said first end of said series L-C resonant circuit, wherein the high voltage impulse is configured to energize the L-C resonant circuit, thereby causing the L-C resonant circuit to extend a tail of said high voltage impulse with a series of high frequency oscillations, wherein the tail is configured to cause a plasma streamer to remain in an ionized state for period of time which is greater than a period of time said plasma streamer would remain in an ionized state without said series L-C resonant circuit, at least until a current ramp up occurs.

2. A method of starting a direct current xenon arc lamp, the method comprising the acts of:

connecting a series coupled L-C resonant circuit between a first lamp electrode and a chassis ground, wherein the series connected L-C resonant circuit is configured to store energy and act as an oscillator; and energizing the series coupled L-C resonant circuit with an initial high voltage impulse, wherein the series coupled L-C resonant circuit is configured to extend a tail or end of the initial high voltage impulse with a plurality of high frequency oscillations, wherein the plurality of high frequency oscillations is configured to cause a plasma streamer in said xenon arc lamp to remain in an ionized state for an extended time until a current ramp up occurs.

* * * * *

UNITED STATES PATENT AND TRADEMARK OFFICE
CERTIFICATE OF CORRECTION

PATENT NO. : 8,476,839 B2  
APPLICATION NO. : 13/092516  
DATED : July 2, 2013  
INVENTOR(S) : Stanislaw W. Swiderek Page 1 of 1

It is certified that error appears in the above-identified patent and that said Letters Patent is hereby corrected as shown below:

Title Page, Item (73) Assignee should read:

Warner Power LLC, Warner, New Hampshire

Signed and Sealed this  
Tenth Day of September, 2013

Teresa Stanek Rea  
*Acting Director of the United States Patent and Trademark Office*